No. 718,127. PATENTED JAN. 13, 1903.
G. HOLMGREN.
MEAT TENDERER.
APPLICATION FILED MAY 15, 1902.
NO MODEL. 2 SHEETS—SHEET 2.
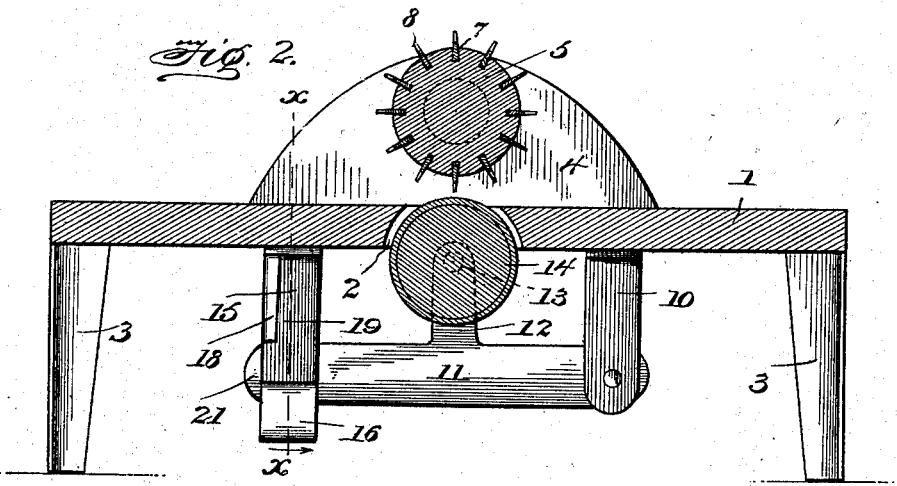
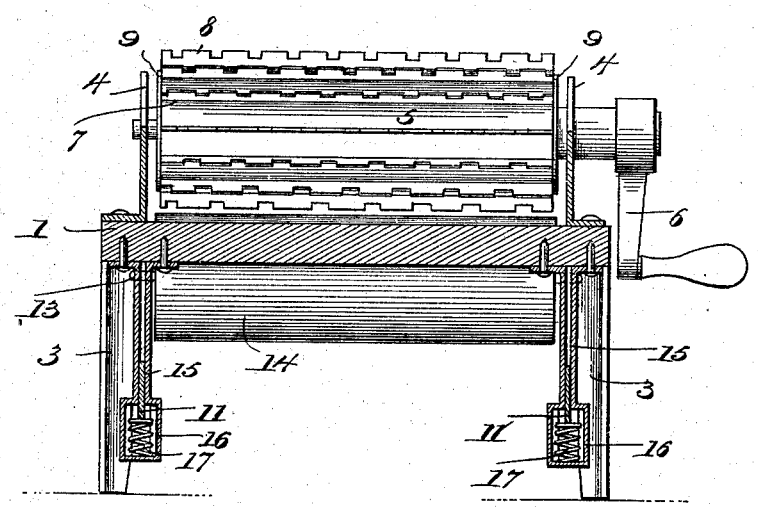
Witnesses
Inventor
Gus Holmgren
By H. B. Willson & Co.
Attorneys

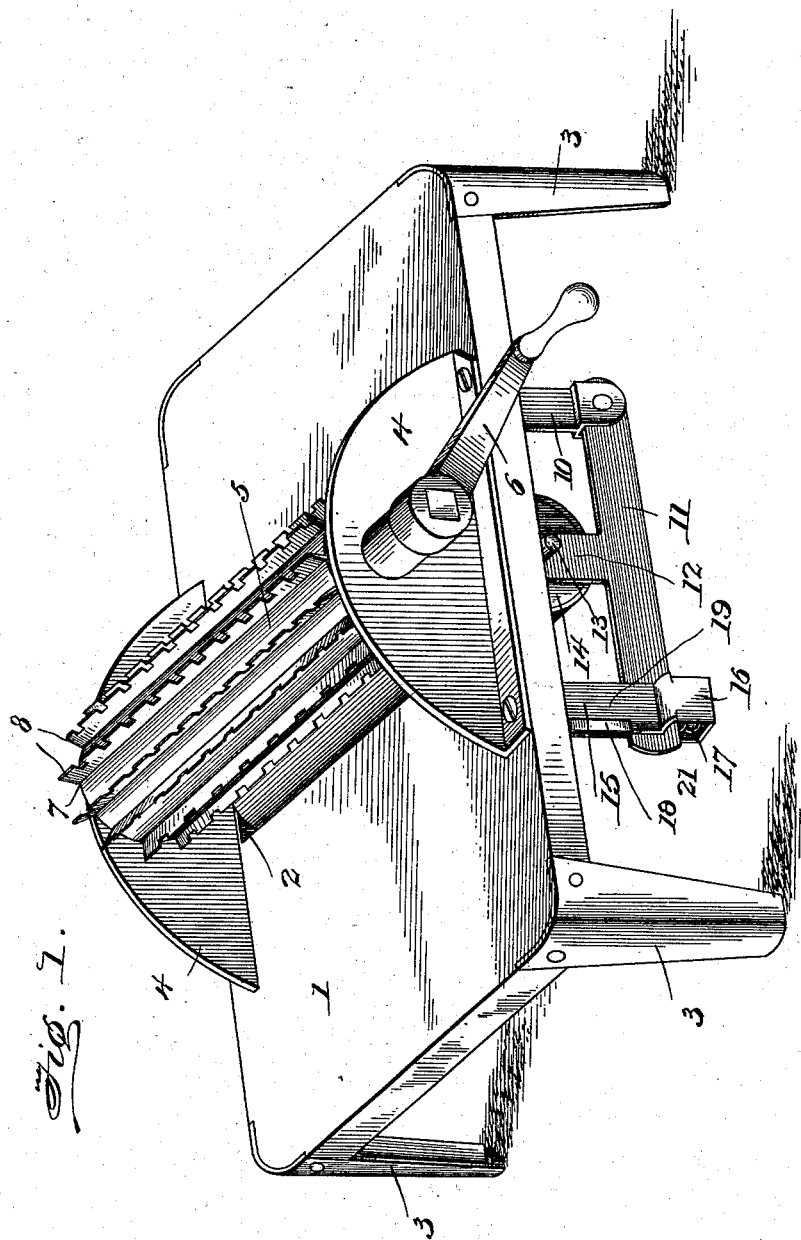

UNITED STATES PATENT OFFICE.

GUS HOLMGREN, OF FRAZEE, MINNESOTA.

MEAT-TENDERER.

SPECIFICATION forming part of Letters Patent No. 718,127, dated January 13, 1903.

Application filed May 15, 1902. Serial No. 107,502. (No model.)

*To all whom it may concern:*

Be it known that I, GUS HOLMGREN, a citizen of the United States, residing at Frazee, in the county of Becker and State of Minnesota, have invented certain new and useful Improvements in Meat-Tenderers; and I do declare the following to be a full, clear, and exact description of the invention, such as will enable others skilled in the art to which it appertains to make and use the same.

The invention relates to meat-tenderers.

The object of the invention is to provide a device of this character which shall be simple of construction, durable in use, comparatively inexpensive of production, and by means of which tough meat may be easily and expeditiously tendered.

With this and other objects in view the invention consists of certain novel features of construction, combination, and arrangement of parts which will be hereinafter more fully described, and particularly pointed out in the appended claim.

In the accompanying drawings, Figure 1 is a perspective view of my improved meat-tenderer. Fig. 2 is a longitudinal vertical sectional view. Fig. 3 is a vertical sectional view through one of the spring-brackets, showing the spring and the free end of the lever; and Fig. 4 is a cross-sectional view on line $x$ $x$ of Fig. 2.

In the drawings, 1 denotes the table or bedplate of the machine, having a transverse opening 2, supporting-legs 3, and journal-bearings 4, the latter being arranged at the opposite ends of the opening 2.

5 denotes a cutter-head journaled in the bearings 4 and provided with a crank 6 for rotating it. This cutter-head may be made of any suitable material and is provided with longitudinal tapering grooves 7, the entrance to which is smaller than the base of the grooves. These grooves are adapted to receive cutting-knives 8, having tapering inner edges, which are fitted to said grooves by slipping the knives endwise into the grooves. Plates 9 are secured to the ends of the cutter-head and serve to prevent endwise movement of said knives within the grooves. These knives are preferably notched at points in their length, as shown, thereby forming each knife with short cutting or puncturing surfaces, which will more effectually tender the meat than if each knife had a continuous straight cutting edge.

10 denotes brackets secured to the under side of the table and projecting downwardly therefrom, and 11 denotes levers one end of each of which is pivoted in one of the brackets and each of which is provided with an upwardly-projecting journal-arm 12, in which is journaled the axis 13 of a roller 14, a portion of the periphery of which projects through the opening in the base or table and lies a short distance below the path of rotation of the knives of the cutter-head.

15 denotes brackets secured at the rear of the brackets 10, and each of these brackets consists of a strip of metal doubled upon itself to form a housing 16, within which is seated a coiled spring 17 and having one of its edges 18 lapped around one of the vertical side pieces 19, thus clamping the side pieces together and serving as a stop to limit the upward movement of the end 21 of the lever, whereby the roller is prevented from being forced upwardly by the springs into contact with the cutter-head.

In operation the meat to be acted upon is placed upon the table and forced between the roller and the cutter-head, the latter being rotated by its crank, and as the meat is drawn through the machine by the rotation of the cutter-head the knives will cut or penetrate it and leave it in a tendered or macerated state. If a bone is encountered by the roller and cutter of a thickness to prevent it from passing between the two in their normal position, the roller will yield, thus allowing the bone to pass freely through the roller and cutter-head.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages of the invention.

Having thus described my invention, what I claim, and desire to secure by Letters Patent, is—

In a meat-tenderer, the combination with a table or bed-plate provided with a transversely-extending opening, of brackets depending from the bottom of the table or bed-plate, levers pivoted under said brackets, a second set of brackets depending from the bottom of the table or bed-plate and consisting of a strip bent upon itself to form a spring-housing and having one of its edges bent upon one of the vertical portions to clamp the vertical portions together and to act as a stop for the forward ends of the levers which project through said housings and lie between the vertical side pieces and the bracket, springs seated in said housings and exerting their energy to force the forward ends of the levers upwardly, bearing-arms secured to and projecting upwardly from said levers, a roller journaled in said bearing-arms and having a portion of its periphery projecting through the transverse opening, and a cutter-head journaled above the table or bed-plate to cooperate with the roller, substantially as set forth.

In testimony whereof I have hereunto set my hand in presence of two subscribing witnesses.

GUS HOLMGREN.

Witnesses:
L. W. OBERHAUSER,
O. H. KOCH.